UNITED STATES PATENT OFFICE.

JOSEPH EDGAR MAHAN, OF SWISSVALE, PENNSYLVANIA, ASSIGNOR TO LEE S. SMITH AND SON MANUFACTURING COMPANY, OF PITTSBURGH, PENNSYLVANIA, A CORPORATION OF PENNSYLVANIA.

DENTAL CEMENT.

1,226,232.        Specification of Letters Patent.     Patented May 15, 1917.

No Drawing.     Application filed June 13, 1916. Serial No. 103,412.

*To all whom it may concern:*

Be it known that I, JOSEPH EDGAR MAHAN, a resident of Swissvale, in the county of Allegheny and State of Pennsylvania, have invented a new and useful Improvement in Dental Cements, of which the following is a specification.

This invention relates to dental cements such as used for cementing in place crowns, bridges and inlays and for filling purposes, and particularly to a cement containing a copper salt for imparting germicidal or antiseptic characteristics thereto.

There are cements now on the market containing a copper salt; the only salts used so far as known to me being the phosphate, iodid, and oxids of copper, both cuprous and cupric. Any one of these salts when present in a cement imparts thereto germicidal properties, but nevertheless such cements are seriously defective in that the addition of these copper salts thereto causes them to discolor to a marked degree the teeth treated. Because of this fact such cements have been restricted in their applicability.

I have discovered that if in a cement containing metallic oxids, silicate of copper is substituted for the copper salts above named, the germicidal properties thereof will be just as pronounced as though any one of the above named copper salts is used and yet there is no tendency toward discoloration.

In preparing my cement I can use either the artificially prepared silicate, or, in those cases where it is found sufficiently pure, the natural silicate or ore. I mix the desired proportion of the silicate of copper with the usual oxids, such as the oxids of zinc, bismuth, magnesium and manganese. In the cements now in use the copper salt is present in proportions varying all the way from 2 per cent. to 90 per cent. In my cement the copper silicate can be used in any amount from 1 per cent. to 50 per cent., but I have found that $2\frac{1}{2}$ per cent. gives very satisfactory results and prefer to use that amount.

In use the cement is made up by admixture of the powder compounded as above specified, with phosphoric acid which has had added thereto some aluminum oxid.

I do not claim the use of a copper salt broadly as one of the ingredients of a dental cement, but only the use of a copper silicate.

What I claim is:—

1. A dental cement containing copper silicate.

2. A dental cement containing metallic oxids and copper silicate.

3. A dental cement containing about $2\frac{1}{2}$ per cent. of copper silicate.

4. A dental cement containing metallic oxids with about $2\frac{1}{2}$ per cent. of copper silicate.

5. A dental cement containing oxids of zinc, bismuth, magnesium, and manganese with copper silicate.

6. A dental cement containing oxids of zinc, bismuth, magnesium and manganese with about $2\frac{1}{2}$ per cent. of copper silicate.

In testimony whereof, I have hereunto set my hand.

JOSEPH EDGAR MAHAN.

Witnesses:
W. LINFORD SMITH,
F. W. WINTER.